US012773679B2

(12) United States Patent
Hanikel et al.

(10) Patent No.: US 12,773,679 B2
(45) Date of Patent: Oct. 27, 2026

(54) SHAPING THE WATER SORPTION PROPERTIES OF MOFs

(71) Applicant: The Regents of the University of California, Oakland, CA (US)

(72) Inventors: Nikita Hanikel, Berkeley, CA (US); Omar M. Yaghi, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 327 days.

(21) Appl. No.: 18/438,276

(22) Filed: Feb. 9, 2024

(65) Prior Publication Data

US 2024/0181424 A1 Jun. 6, 2024

Related U.S. Application Data

(63) Continuation of application No. PCT/US2022/039492, filed on Aug. 4, 2022.

(60) Provisional application No. 63/232,621, filed on Aug. 12, 2021.

(51) Int. Cl.

| | |
|---|---|
| ***B01J 20/22*** | (2006.01) |
| ***B01D 53/02*** | (2006.01) |
| ***B01D 53/26*** | (2006.01) |
| ***B01D 53/28*** | (2006.01) |
| ***B01J 20/30*** | (2006.01) |
| ***C07F 5/06*** | (2006.01) |
| ***E03B 3/28*** | (2006.01) |

(52) U.S. Cl.
CPC ............ *B01J 20/226* (2013.01); *B01D 53/02* (2013.01); *B01D 53/261* (2013.01); *B01D 53/28* (2013.01); *B01J 20/3085* (2013.01); *C07F 5/069* (2013.01); *E03B 3/28* (2013.01); *B01D 2253/204* (2013.01); *B01D 2257/80* (2013.01); *B01D 2258/06* (2013.01)

(58) Field of Classification Search
CPC ...................................................... B01J 20/226
See application file for complete search history.

(56) References Cited

U.S. PATENT DOCUMENTS

2022/0176344 A1* 6/2022 Mulet .................. B01D 53/261

FOREIGN PATENT DOCUMENTS

EP 4410419 A1 * 8/2024 ............. B01D 53/02
WO 2020112899 6/2020

OTHER PUBLICATIONS

International Search Report for PCT/US22/39492, 10 pages (Dec. 7, 2022).

* cited by examiner

*Primary Examiner* — Robert A Hopkins
(74) *Attorney, Agent, or Firm* — Rudy J. Ng; Bozicevic, Field & Francis LLP

(57) ABSTRACT

Method and systems are used to shape the water sorption properties of MOFs by utilizing a multivariate approach.

6 Claims, 5 Drawing Sheets

I
II
III
IV
V
VI
VII
VIII
IX
X
XI
XII
XIII
XIV
a
b
c
H2O in different water structure evolution stages: Seeding Clustering Networking

SHAPING THE WATER SORPTION PROPERTIES OF MOFs

CROSS-REFERENCES TO RELATED APPLICATIONS

This application is a continuation of PCT/US22/39492, filed: Aug. 4, 2022, which claims priority to U.S. Provisional Application No. 63/232,621, filed: Aug. 12, 2021, the disclosures of which are hereby incorporated by reference in its entirety for all purposes.

This invention was made with government support under grant number HR0011-21-C-002 from the Department of Defense Advanced Research Projects Agency. The government has certain rights in the invention.

INTRODUCTION

Water and its behavior in natural and synthetic systems have been a subject of extensive study because of its unique properties and importance to life (1-4). The recent discovery that porous metal-organic frameworks (MOFs) (5,6) can extract atmospheric water in the desert to produce clean drinking water promises access to an untapped resource for alleviating the global water stress (7-12). The question of how such MOFs 'pluck out' water from arid air, and easily release it, remains largely unanswered, especially on the molecular level. Indeed, the evolution of water structures in MOFs and synthetic crystals is sought after and a full mechanistic understanding of water uptake behavior is still missing (13-22). While the water positions in some of these structures have been determined using diffraction techniques (16, 18, 21), the mechanism of how water binding sites are populated is much harder to decipher requiring high-quality data and the ability to collect them at each loading increment. Knowledge of the mechanism for water behavior in MOFs provides a handle to designing water harvesting systems capable of operating with greater energy efficiency and productivity.

SUMMARY OF THE INVENTION

We disclose how to decipher the water filling mechanism for MOFs, including the state-of-the-art water harvesting metal-organic framework-303, by single-crystal x-ray diffraction measurements and density functional theory (DFT) calculations, and how to deliberately shape the water uptake behavior and achieve favorable properties for water harvesting from desert air.

In an aspect the invention provides methods and systems to shape the water sorption properties of MOFs by utilizing a multivariate approach, and compositions produced by such methods and systems.

In an aspect the invention provides a method or system to design and build a porous metal-organic framework (MOF) to shape the water sorption properties of the MOF, the MOF comprising metal nodes and organic linkers, the method or system comprising utilizing a multivariate approach by selecting and incorporating in the MOF a ratio of a plurality of different linkers to shape the water sorption properties of the MOF.

In an aspect the invention provides a method to shape the water sorption properties of a porous metal-organic framework (MOF), comprising applying multivariate modifications to a precursor MOF to create a modified MOF to achieve a targeted water sorption feature to deliberately shape water behavior in the pores of the modified MOF, such as wherein the method controls a parameter pertaining to energy consumption, productivity and kinetics.

In an aspect the invention provides a method to shape the water sorption properties of a porous metal-organic framework (MOF) comprising metal nodes and organic linkers, the method comprising isomorphous substitution of atoms of the organic linkers (without adding new functional groups) to control the pore environment and therefore shape isotherms without compromising uptake capacity and framework stability.

In an aspect the invention provides a method for evolving water structures of a precursor porous metal-organic framework (MOF), comprising:

- determining of the water uptake mechanism by locating all water molecules in the pores of the precursor MOF using single-crystal x-ray diffraction (SXRD) and identifying the molecule-by-molecule sequence of filling these locations; and
- employing a multivariate MOF strategy in which multiple functionalities decorate the pores across the crystal, to achieve design of the geometry and strength of water interactions in a series of multivariate MOFs, for example to precisely control the humidity levels at which these compounds extract water from arid air, heat of adsorption, desorption temperature, and water productivity, without compromising the pore size, shape or hydrolytic stability.

In an aspect the invention provides a porous metal-organic framework (MOF) composition produced by a disclosed method or system.

In an aspect the invention provides a porous metal-organic framework (MOF) comprising MOF-333: Al(OH) FDC; $FDC^{2-}$=2,4-furandicarboxylate.

In an aspect the invention provides a porous multivariate metal-organic framework (MOF) comprising a mixture of $PZDC^{2-}$ and $FDC^{2-}$ within one MOF crystal; wherein $PZDC^{2-}$=1-H-pyrazole-3,5-dicarboxylate, $FDC^{2-}$=2,4-furandicarboxylate, wherein the mixture is in a ratio n/m=7/1, 6/3, 5/3, 4/4, 3/5, 2/6 or 1/7.

In an aspect the invention provides a porous multivariate metal-organic framework (MOF) comprising a mixture of $PZDC^{2-}$ and $FDC^{2-}$ within one MOF crystal; $PZDC^{2-}$=1-H-pyrazole-3,5-dicarboxylate, $FDC^{2-}$=2,4-furandicarboxylate.

In an aspect the invention provides a porous multivariate metal-organic framework (MOF) comprising Al(OH) $PZDC_n/FDC_m$; wherein $PZDC^{2-}$=1-H-pyrazole-3,5-dicarboxylate, $FDC^{2-}$=2,4-furandicarboxylate, and n/m=7/1, 6/3, 5/3, 4/4, 3/5, 2/6 or 1/7.

The invention encompasses all combinations of the particular embodiments recited herein, as if each combination had been laboriously recited.

DESCRIPTION OF PARTICULAR EMBODIMENTS OF THE INVENTION

Unless contraindicated or noted otherwise, in these descriptions and throughout this specification, the terms "a" and "an" mean one or more, the term "or" means and/or and polypeptide sequences are understood to encompass opposite strands as well as alternative backbones described herein. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

EXAMPLES

In these examples we report, inter alia, the successful determination of the uptake mechanism of the state-of-the-art water harvesting MOF [MOF-303: Al(OH)PZDC, $PZDC^{2-}$=1-H-pyrazole-3,5-dicarboxylate, FIG. 1A] (9,10) by locating all water molecules in its pores using single-crystal x-ray diffraction (SXRD) and identifying the molecule-by-molecule sequence of filling these locations. It has been a common observation that the metal oxide units of MOFs are the strongest water binding sites (15,16,20). We show both experimentally and computationally that the organic linkers play a primary role as adsorptive sites in MOF-303, where they are aligned to create hydrophilic pockets into which the first water molecules bind strongly and seed further uptake. We employed the multivariate MOF strategy (23,24), in which multiple functionalities decorate the pores across the crystal, to achieve pin-point design of the geometry and strength of water interactions in a series of nine multivariate MOFs. This approach allowed us to precisely control the humidity levels at which these compounds extract water from arid air, heat of adsorption, desorption temperature, and water productivity, without compromising the pore size, shape or hydrolytic stability. Such an achievement has not been realized thus far in MOFs or other materials. On a fundamental level, this study transforms the development of water harvesting materials from a trial-and-error activity to precision molecular design and deliberate shaping of the water behavior in the pores.

Figure 1A:
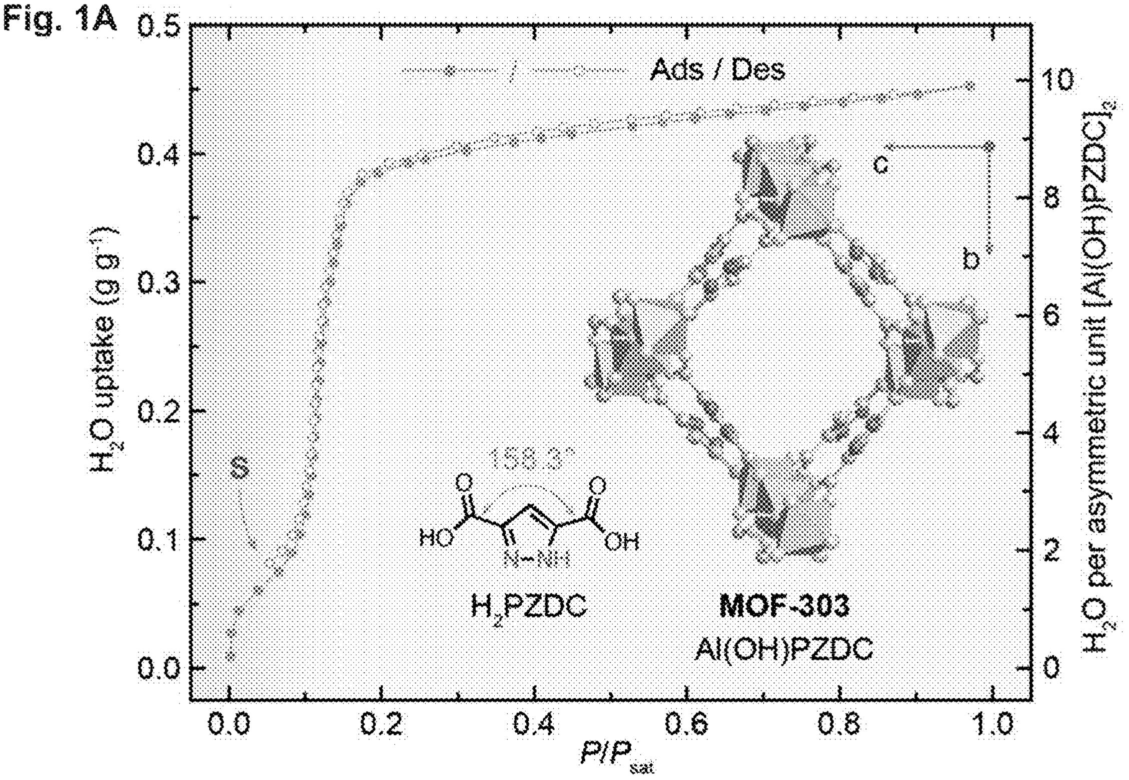
FIGS. 1A-1B: Water sorption isotherm and crystal structure of MOF-303. (A) Water sorption isotherm at 25° C. P, water vapor pressure; $P_{sat}$, saturation water vapor pressure. The water uptake is displayed gravimetrically and with respect to the asymmetric unit $[Al(OH)PZDC]_2$ of MOF-303. The three segments of the isotherm are highlighted in red, yellow and blue in the background. The linker 1H-3,5-pyrazoledicarboxalic acid ($H_2PZDC$) and MOF crystal structure are shown in inset. The initial step is labeled with S. (B) Side view visualizing two hydrophilic pockets defined by a pair of pyrazole-based linkers with their nitrogen atoms pointing towards each other and flanked by two aluminum oxide rod-like SBUs. Coordinate systems are given for guidance. Al, blue polyhedron; O, pink; C and H, gray; N, green.
Figure 1B:
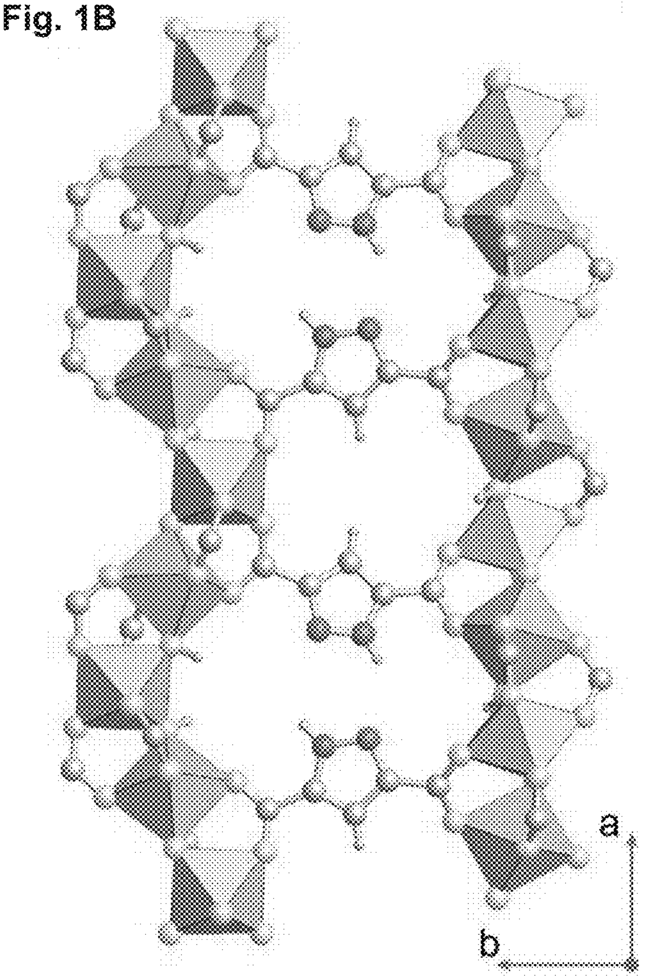

The structure of MOF-303 is based on infinite rod-like secondary building units (SBUs) consisting of alternating cis-trans-corner-shared $AlO_6$ octahedra which are connected by the $PZDC^{2-}$ linkers (FIG. 1), overall resulting in the xhh topology (25). This arrangement has neighboring pyrazole functionalities that point towards each other and form a pocket defined by three $\mu_2$—OH groups and the two N(H) on each of the linkers (FIGS. 1, A and B). Water adsorption into this environment results in an unusual water sorption isotherm, where at low vapor pressures (red segment) the isotherm exhibits a small but significant step (labeled S, FIG. 1A). Step S reduces the water harvesting output per cycle (working capacity) for this MOF by about 20 wt %, and upon cycling extensively this reduction amounts to large quantities of water. As additional water fills the pore, a large water uptake within a small relative humidity (RH) window is observed in the isotherm (yellow segment). Further water uptake by MOF-303 fills the pores entirely over a large RH range (blue segment). Herein, we show how to eliminate the initial step S by understanding the water uptake process through locating the adsorption sites and the mechanism with which they are populated.

Accordingly, we grew single crystals of sufficient size (15×15× 20 $\mu m^3$; section S1.2) to be studied by synchrotron SXRD. For the determination of the water structures at different loadings, we developed a procedure by which it is possible to slowly desorb water upon gradually ramping up the temperature of the dry protective gas stream. The process was designed to be sufficiently mild to avoid crystal cracking; an issue often preventing SXRD analysis. This procedure initiated a controlled release of water molecules from the MOF pores, which we were able to monitor closely by collecting a series of SXRD datasets (section S2.1). The fact that there is an almost perfect overlay of the ad- and desorption isotherm curves with minimal hysteresis observed for MOF-303 (FIG. 1A) indicates that the water sorption process is reversible, and can therefore be studied in either the adsorption or desorption mode. Thus, our measurements allowed us to decipher the molecular water adsorption mechanism of MOF-303.

Figure 2A:
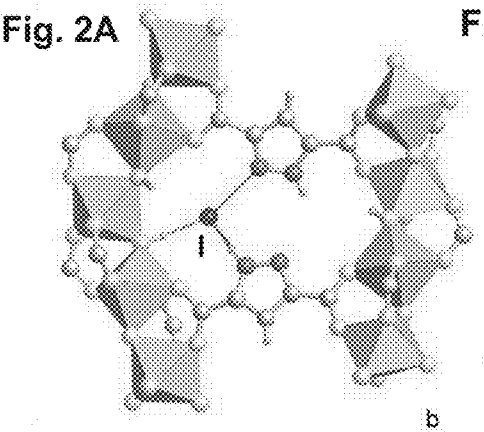
FIGS. 2A-2E. Crystal structures of the seeding water adsorption sites in MOF-303. (A-D) Sequential adsorption of the first four water molecules (I-IV) per asymmetric building unit depicted in the hydrophilic pocket, as determined by SXRD analysis. (E) Three-dimensional view of the first four water molecules in the framework pore. H-bonds are depicted as red dashed lines. Black solid bars at the end of H-bonds represent binding interactions to the MOF, which is partially omitted for clarity. Al, blue polyhedron; O in the framework structure, pink; O in $H_2O$, red; C and H, gray; N, green.
Figure 2B:
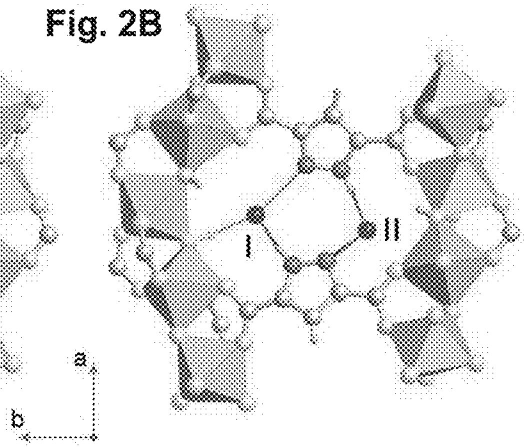
Figure 2C:
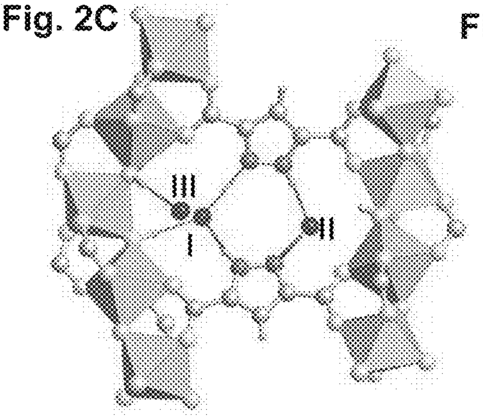
Figure 2D:
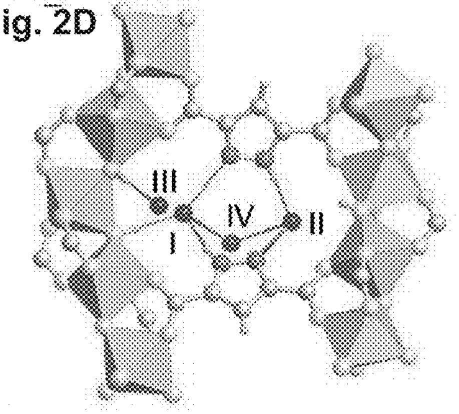
Figure 2E:
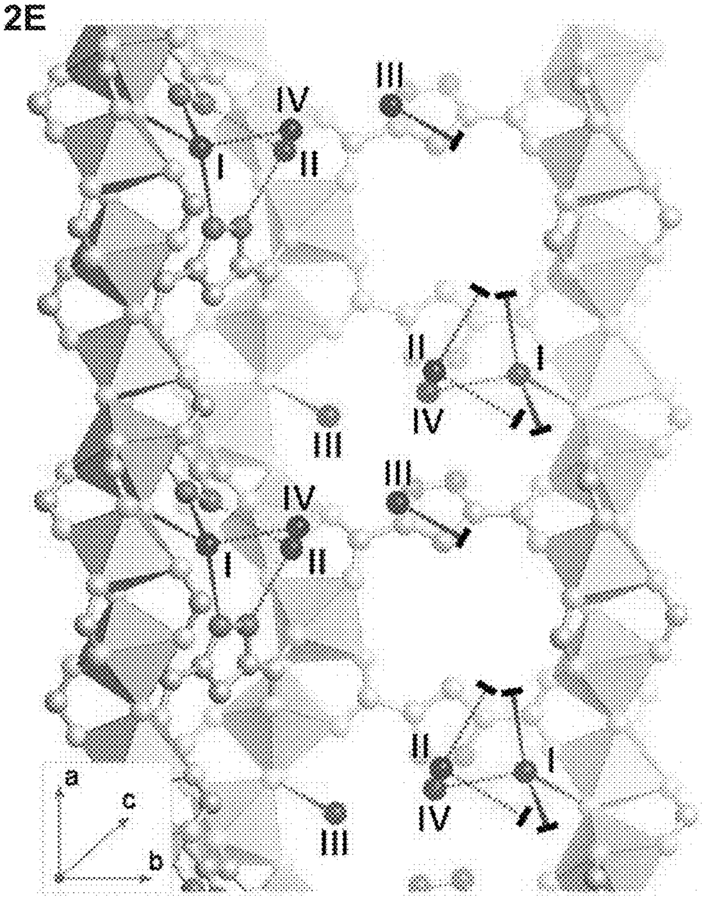

SXRD analysis revealed that the first and strongest water adsorption site (labeled I) of the framework lies between the pyrazoles, in which the water molecule forms three H-bonds to two pyrazole groups and one $\mu_2$—OH group with the respective distances of 2.797(7), 2.887(9) and 2.798(6) Å between the heteroatoms (FIG. 2A). The second water molecule (II) was also located between the pyrazoles, this time having two H-bonds with N···$O_{water}$ distances of 2.72 (2) and 2.96(3) Å (FIG. 2B). Both of these sites lie within the hydrophilic pocket of MOF-303, and can clearly be associated with the step S at low vapor pressures being responsible for reducing the working capacity. The next water molecule resides at site III where it only interacts with the remaining $\mu_2$—OH group at a distance of 2.89(3) Å (FIG. 2C). The fourth water molecule (IV) H-bonds to the water molecules at I and II but not to the framework, forming a trimer cluster (I, II, IV; FIG. 2D), with the water molecule at III remaining detached from it. At this loading stage, such clusters are isolated from others in neighboring symmetry equivalent pockets. Adsorption of water molecules at I-IV represents the seeding stage (red segment in FIG. 1A), which serves as nucleus for binding of other water molecules.

In a parallel effort, we predicted the seeding water adsorption sites in MOF-303 using density functional theory (DFT) calculations (section S3.1). We found that, similar to our experimental observations, the first adsorbed water molecule exhibits two short H-bonds to the pyrazole moieties (both 2.8 Å) and one short H-bond to the $\mu_2$—OH group (2.7 Å). The second water molecule was determined to H-bond to the neighboring pyrazole pair (2.6 Å and 2.8 Å), thus further confirming the role of the aligned pyrazole functionalities as primary adsorption sites. The third and fourth water molecules H-bond to the second $\mu_2$—OH group and to the initially adsorbed water molecules, respectively; resulting in a geometrical water arrangement closely resembling the obtained SXRD structures, where the first three molecules are adsorbed onto the framework and the fourth molecule H-bonds with these molecules.

Figures 3A, 3B, 3C, 3D, 3E, 3F:
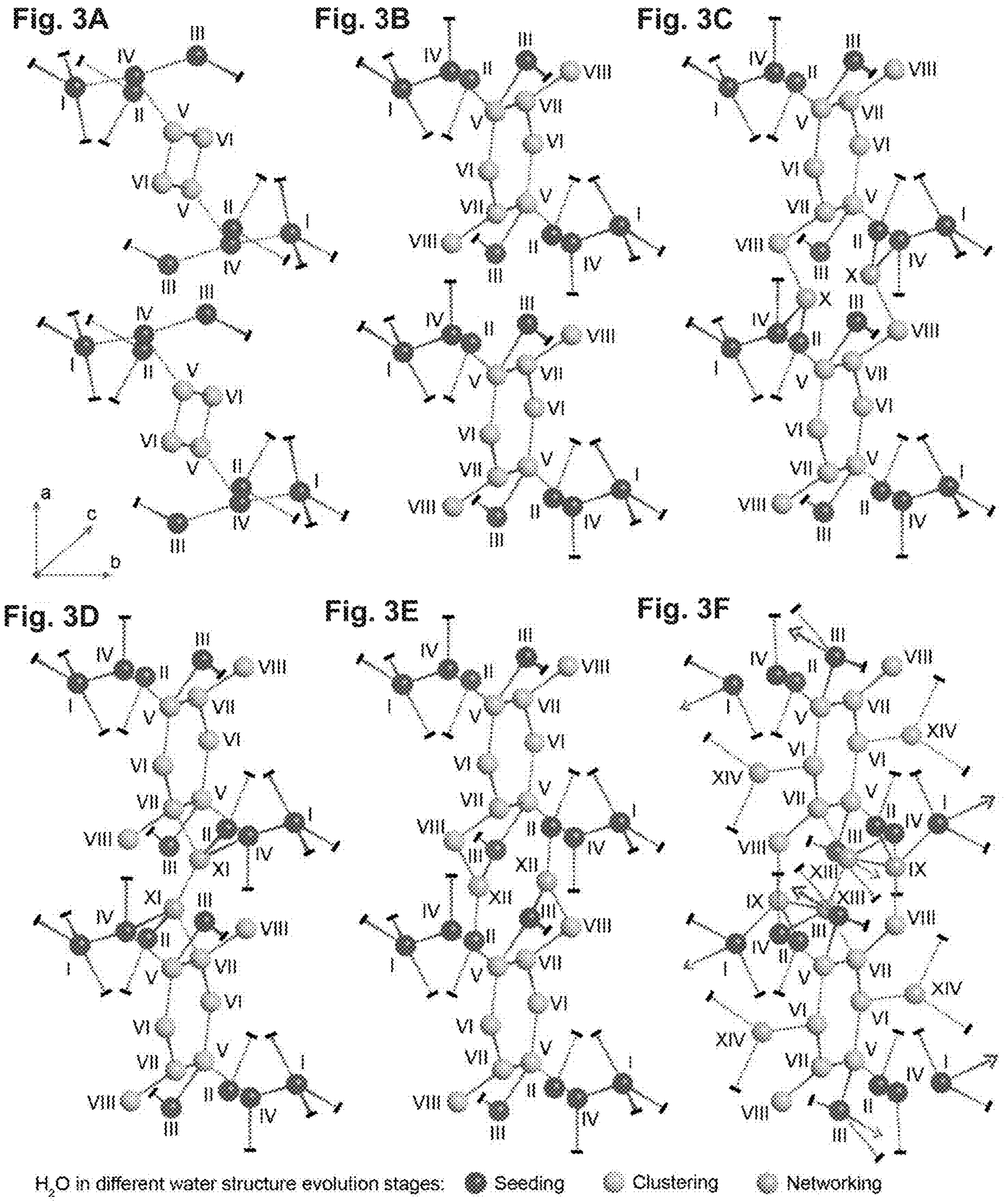
FIGS. 3A-F. Evolution of water structures in MOF-303 at increased loadings. (A-F) Water molecule positions at different adsorption states, as determined by SXRD analysis. H-bonds are depicted as red dashed lines. Black solid bars at the end of H-bonds represent binding interactions to the MOF, which is omitted for clarity. The viewing direction for all panels is the same as in FIG. 2E. Arrows in (F) indicate periodic extension of water chains into a three-dimensional water network. Displayed are only O in $H_2O$ with coloring indicating the pore filling stages: seeding, red; clustering, yellow; networking, blue. H-atoms are omitted for clarity.

The crystallographic study reveals that further water molecules fill the pores by interacting with other water molecules rather than the framework (FIG. 3). Adsorption of two additional water molecules at V and VI yields a structure in which the neighboring clusters (I, II, IV) are connected with each other through new water tetramer clusters (FIG. 3A). Upon addition of water molecules at VII and VIII, the tetramers transform into hexamers (V-VII) with one dangling water molecule at VIII connected to VII (FIG. 3B). The evolution of water structures from V to VIII, termed the clustering stage, falls in the yellow segment of the water sorption isotherm (FIG. 1A).

At higher water loadings, the sequential partial filling of sites IX-XIV together with the fully occupied sites I-VIII makes infinite H-bonded water chains of clustering units (networking stage, blue segment in FIG. 1A). First, the mutually exclusive, disordered sites IX and X are populated simultaneously, with the associated water molecules H-bonding to the water molecules at II, IV and VIII (FIG. 3C, only X is depicted for clarity). Second, site XI-connected to II, IV and VII—is partly filled (FIG. 3D); and third, partial population of site XII connects II, III and VIII (FIG. 3E). At the highest loading, the pyrazole functionalities become slightly displaced, while a water molecule inserts at XIII between the sites IV, VII and IX, consequently rearranging the water molecule at IX to H-bond to the species at I, II and VIII. These changes to the framework and restructuring of the water network resulted in partial filling of site XIV, in which the water molecule H-bonds to the O-atoms of the carboxy functional groups (FIG. 3F). At this loading, sites IX-XIV are co-populated and partly filled with a total occupational factor of two (table S3). Ultimately, neighboring chain networks connect into a three-dimensional water network. It is noteworthy that the highest water load of ten water molecules per asymmetric unit, whose crystallographic locations were presented above, corresponds to a total uptake of 0.46 g $g^{-1}$, which is in agreement with the total uptake found in the water sorption isotherm (FIG. 1A).

The conducted series of SXRD measurements allowed us to further elaborate the impact of water uptake on the framework. We found that throughout the water adsorption process, the MOF undergoes substantial structural transformations. This can be appreciated by tracking the unit cell parameter changes, at its extreme, from 14.5037(6) to 16.7259(7) Å in b direction, and 101.465(2) to 105.091(2)° in β, at different loadings (table S1). Furthermore, we conducted SXRD measurements on the fully activated MOF at both 330 and 100 K and observed only incremental unit cell changes on the order of 0.01 Å. This confirmed that these transitions are not caused by temperature variations but rather by water filling the pores. In contrast, a larger difference was observed in the unit cell dimensions (up to 0.5 Å in b direction) between the activated and fully loaded MOF at 100 K. Close examination of the hydrophilic pocket at different loadings revealed that the neighboring pyrazoles undergo adjustments to fit the water molecules (table S5). Specifically, the closest intermolecular N···N-distance in the activated structure is 3.218(5) Å. Then, upon first and second water binding, this distance grows to 3.708(7) Å and 3.760(8) Å, respectively, as the pyrazole functionalities move apart to accommodate the water molecules. At full water load, the N···N-distance peaks at 4.364(3) Å to allow the formation of a three-dimensional water network.

Having identified both experimentally and computationally that the step in the water sorption isotherm originates from water interactions (sites I and II) with two neighboring pyrazole functionalities, we decided to precisely control the H-bonding in the pocket by substituting $PZDC^{2-}$ with another linker of less hydrophilicity. By using 2,4-furandicarboxylic acid ($H_2FDC$), we were able to synthesize a new MOF [MOF-333: Al(OH)FDC; $FDC^{2-}$=2,4-furandicarboxylate, FIG. 4A] isoreticular to MOF-303 (26,27), i.e., it is built from rod-like SBUs consisting of cis-trans corner-shared $AlO_6$ octahedra. We note that the sequence of the SBU is likely programmed by the similar angle between the carboxylic acid groups of the two linkers (158.3° for $H_2PZDC$ and 156.5° for $H_2FDC$, as evidenced by SXRD; section S2.2), and results in higher pore volumes and consequently also water uptakes compared to other Al-MOFs built from rod-like SBUs (28).

In comparison to pyrazole, furan was expected to undergo weaker H-bonding with water molecules, as it is less acidic and less basic. Indeed, DFT calculations of the adsorption structures in MOF-333 suggested a stronger interaction of the water molecules with the $\mu_2$—OH group rather than the linker molecule, which could be evidenced by the respective interatomic distances (section S3.2). Furthermore, the computed binding energies indicated that water adsorption into the MOF-303 pocket is significantly stronger than into the MOF-333 pocket.

By following a similar SXRD procedure as described above for MOF-303, we were able to identify the primary adsorption sites in MOF-333 (section S2.3). The initially bound two water molecules (I' and II') can clearly be distinguished by SXRD analysis. They exhibit one strong H-bond to an individual μ2-OH group with the $O_{OH}$···$O_{water}$ distances of 2.770(14) and 2.779(15) Å. In addition, water molecule I' experiences only a very weak interaction with the furan linker with an $O_{furan} \cdots O_{water}$ distance of 3.01(2) Å, thus further confirming our linker choice to moderate the water sorption properties of MOF-303 (FIG. 4A).

Figure 4A:
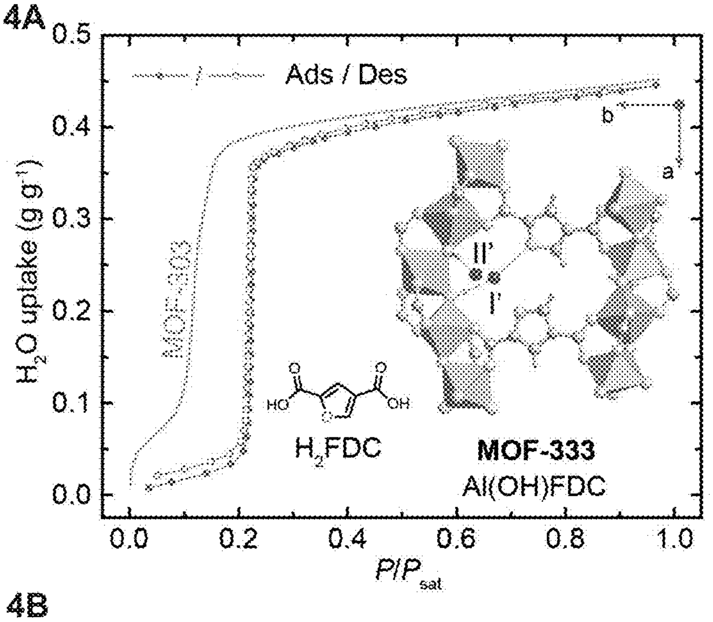
FIGS. 4A-F. Characterization of the multivariate MOF series. (A) Water sorption isotherm of MOF-333 at 25° C. Water sorption isotherm of MOF-303 is shown as a gray line for reference. The linker 2,4-furandicarboxylic acid ($H_2FDC$) and the pocket of MOF-333 with the first two adsorption sites (I' and II') are shown in inset. Al, blue polyhedron; O in the framework structure, pink; O in $H_2O$, red; C and H, gray; N, green. For simplicity, only one orientation of the C/O positional disorder of $FDC^{2-}$ in the MOF structure is shown. (B) $H_2FDC$ linker ratio determined by NMR and C/N elemental microanalysis (EA) are plotted against the respective input linker ratio. Standard deviations (estimated from duplicate measurements on the same sample for EA and analysis of three separate samples for NMR) are depicted as error bars. (C-D) Full-range and low-pressure region of the water sorption analyses on the multivariate MOF series at 25° C. P, water vapor pressure; $P_{sat}$, saturation water vapor pressure. (E) Water vapor isobar measurements at 0.85-1.70 kPa for '8/0', '4/4' and '0/8'. (F) Water adsorption-desorption cycling of '4/4' between 30 and 85° C. at 1.70 kPa for 2000 cycles.

Next, we conducted water sorption analysis on MOF-333 and observed an ideally shaped water sorption isotherm with a steep step at 22% RH, absent of the step S observed for MOF-303 (FIG. 4A). This value set a low humidity cut-off at which our new MOF can operate. To extend its working range to more arid conditions, we decided to prepare a series of multivariate MOFs consisting of both $PZDC^{2-}$ and $FDC^{2-}$. Therefore, we synthesized nine MOFs covering the whole range of linker mixing ratios including the two single-linker frameworks MOF-303 and MOF-333. We use the nomenclature 'n/m' which describes the input ratio of $PZDC^{2-}$ to $FDC^{2-}$ (n to m): For example, '5/3' stands for a 5 to 3 input ratio of $PZDC^{2-}$ to $FDC^{2-}$ and '0/8' refers to the single-linker MOF-333.

Figure 4B:
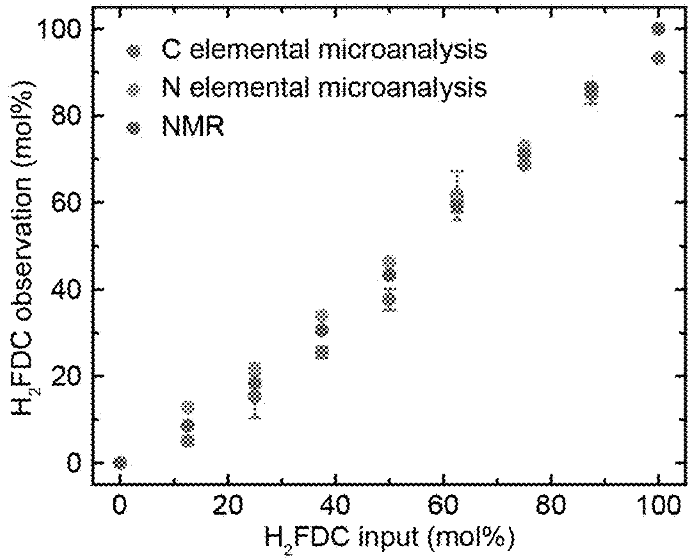

Powder x-ray diffraction (PXRD) analysis identified that all nine products are isostructural (section S4). The linker ratio for each MOF in the multivariate series was determined by NMR analysis on completely base-hydrolyzed MOF crystals and elemental microanalysis, and found to be nearly proportional to the input ratio (FIG. 4B and section S5). The close correspondence between the input and output ratios and the reproducible nature of this reaction chemistry indicated a robust reaction across all ratios; a behavior that may be called formulaic. Additionally, the presence and homogeneous distribution of $PZDC^{2-}$ in the multivariate MOF crystals and absence of single-linker MOFs was verified by scanning electron microscopy coupled with energy dispersive spectroscopy (section S6). Elemental mapping of Al, C, N and O unambiguously resembled the crystal outlines, and the overall intensity of the N signal homogeneously decreased with increasing substitution of $PZDC^{2-}$ with $FDC^{2-}$ (FIG. S32).

In addition to probing the composition of the synthesized compounds, their thermal stability as well as their porosity were assessed with help of thermogravimetric analysis and $N_2$ sorption analysis, respectively. The MOF series exhibited no weight loss up to 375° C. under $N_2$ and up to 325° C. under air atmosphere (section S7). The BET areas (1280-1360 $m^2 g^{-1}$), pore volumes (0.48-0.51 $cm^3 g^{-1}$) and diameters (~9.4 Å) extracted from $N_2$ sorption measurements on all nine compounds were found to be comparable and consistent with an isostructural series of MOFs (section S8). In this context, we would like to emphasize that the small variation in pore volumes stands in contrast to the conventional method of tuning MOF hydrophilicity involving the addition of functional groups to the framework backbone, which invariably reduces the free pore volume and subsequently also the water uptake capacity (16,29,30).

Figure 4C:
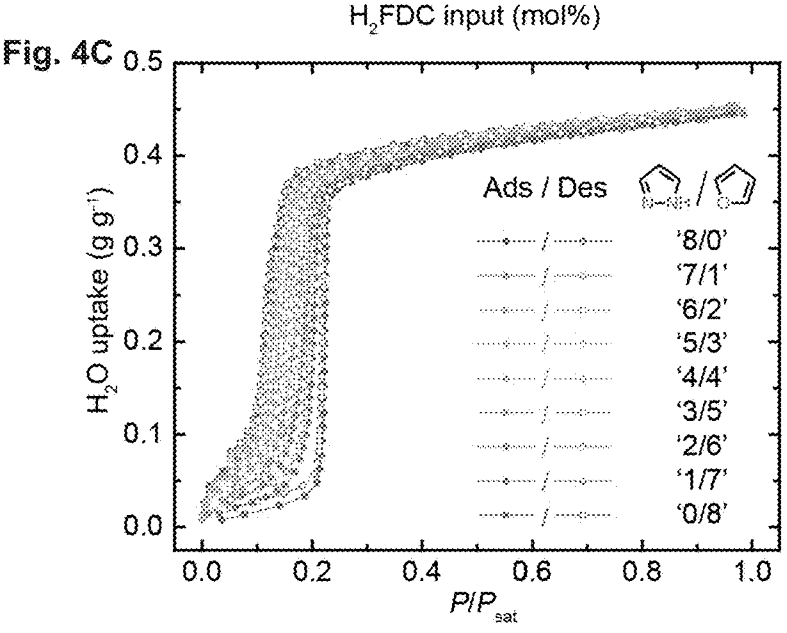
Figure 4D:
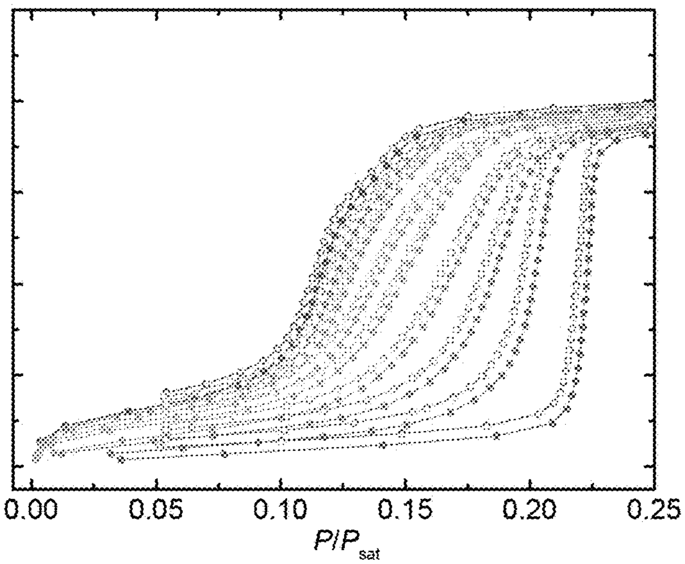

We observed that the substitution of $PZDC^{2-}$ with increasing amounts of $FDC^{2-}$ continuously shifted the water isotherm step towards higher vapor pressures; overall covering the whole range between the water sorption isotherms of MOF-303 and MOF-333 (FIG. 4C). Furthermore, in accordance to the analogous pore volumes of all MOF compounds, the maximal water uptake capacity is not compromised upon linker substitution. We note that the initial step in the isotherm of MOF-303 is successfully mitigated with increasing $PZDC^{2-}$ substitution and its prominence disappears at $FDC^{2-}$ contents larger than 50%. All multivariate MOFs exhibit negligible hysteresis between the adsorption and desorption curves (FIG. 4D)—a desirable feature because hysteresis tends to reduce the working capacity and generally increases the energetic requirement for sorbent regeneration. Overall, we would like to emphasize that the formulaic character of this multivariate series (FIG. 4B) and the continuous variation of the water sorption behavior allow us to accurately design water sorption isotherms by simply choosing an appropriate input linker ratio.

Additionally, we assessed the impact of the multivariate strategy on the water adsorption enthalpies by extending our water sorption analysis to other temperatures (15, 35 and 45°) C. Similar to the measurements at 25° C., the water sorption isotherms exhibited continuity within the multivariate series, lack of hysteresis and similar maximal uptakes—all signs of consistent performance across different temperatures (section S9.1). From these isotherms, we estimated the differential adsorption enthalpy $\Delta h_{ads}$ for all nine compounds by using the Clausius-Clapeyron equation (section S9.2). As anticipated, we observed that with increasing degree of $FDC^{2-}$ incorporation the average $\Delta h_{ads}$ increased continuously from −53 to −50 kJ $mol^{-1}$. We note that the heat of vaporization of water at 25° C. is −44 kJ $mol^{-1}$ and represents the maximal possible enthalpy value for $\Delta h_{ads}$. Thus, the multivariate method allowed us to effectively decrease the adsorption heat penalty by up to a substantial 35%.

Figure 4E:
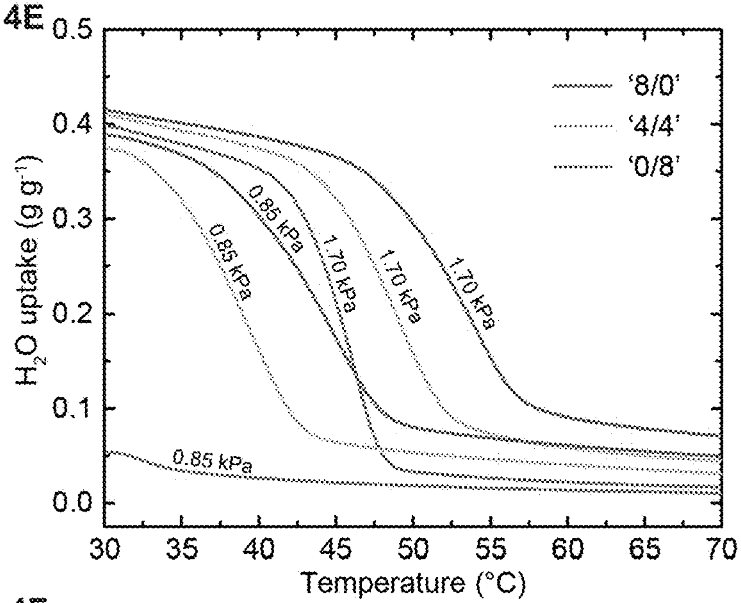

In addition to tuning the isotherm shape and enthalpy of adsorption, our multivariate approach can be used to design water sorbents with ultra-low desorption temperatures. This was demonstrated by measuring isobaric desorption curves at water vapor pressures between 0.85 and 1.70 kPa (corresponding to 20-40% RH at 30)° C. for '8/0', '4/4' and '0/8' (section S9.3). The isobars exhibit a steep step, which increases with higher vapor pressures. Importantly, the minimal desorption temperature can be decreased up to 10° C. by substituting $PZDC^{2-}$ with $FDC^{2-}$ in the MOF structure (FIG. 4E). Furthermore, and in accordance with the isotherms, the working capacity increases with higher $FDC^{2-}$ contents up to 15%. Both of these factors have fundamental impact on energetic requirements and output per cycle of a water harvesting system. Additionally, it is worth noting that higher desorption temperatures will restrict the number of cycles the water harvester can perform daily because longer heating and subsequent cooling times will be necessary to drive the higher temperature gradients.

Figure 4F:
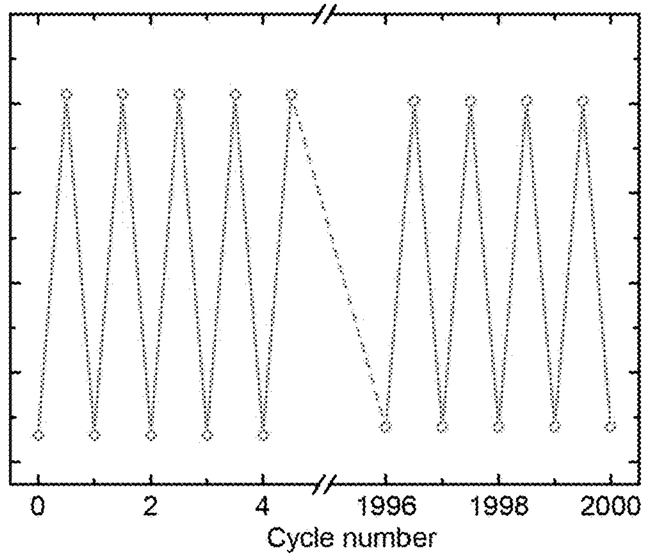

Lastly, we confirmed that mixing of $PZDC^{2-}$ and $FDC^{2-}$ within one MOF crystal does not compromise the hydrolytic stability of the single-linker framework by exposing '4/4' as representative material to 1.7 kPa water vapor pressure and cycling the temperature between 30 and 85° C. (FIG. 4F and section S9.4)—a test that reliably verifies the MOF's longevity (11,31). Indeed, after 2000 uptake and release cycles, the sorbent retained ~97% of its working capacity.

In conclusion, our findings show the impact of identifying the adsorptive sites, mechanism of water uptake, and evolution of water structures on the precise shaping of the water harvesting behavior in MOFs. The multivariate approach makes it possible to control important parameters pertaining to energy consumption, productivity and kinetics. Isomorphous substitution of atoms on the organic linkers (without adding new functional groups) is an effective means of precisely controlling the pore environment and therefore shaping isotherms without compromising uptake capacity and framework stability.

REFERENCES AND NOTES

1. J. Israelachvili, H. Wennerström, Role of hydration and water structure in biological and colloidal interactions. *Nature*. 379, 219-225 (1996).

2. P. Ball, Water as an active constituent in cell biology. *Chem. Rev.* 108, 74-108 (2008).
3. U. Kosinska Eriksson, G. Fischer, R. Friemann, G. Enkavi, E. Tajkhorshid, R. Neutze, Subangstrom Resolution X-Ray Structure Details Aquaporin-Water Interactions. *Science.* 340, 1346-1349 (2013).
4. R. H. Tunuguntla, R. Y. Henley, Y.-C. Yao, T. A. Pham, M. Wanunu, A. Noy, Enhanced water permeability and tunable ion selectivity in subnanometer carbon nanotube porins. *Science.* 357, 792-796 (2017).
5. O. M. Yaghi, M. J. Kalmutzki, C. S. Diercks, *Introduction to Reticular Chemistry: Metal-Organic Frameworks and Covalent Organic Frameworks* (Wiley-VCH, Weinheim, 2019).
6. L. Öhrström, F. M. Amombo Noa, *Metal-Organic Frameworks* (American Chemical Society, Washington, DC, USA, 2021).
7. H. Kim, S. Yang, S. R. Rao, S. Narayanan, E. A. Kapustin, H. Furukawa, A. S. Umans, O. M. Yaghi, E. N. Wang, Water harvesting from air with metal-organic frameworks powered by natural sunlight. *Science.* 356, 430-434 (2017).
8. H. Kim, S. R. Rao, E. A. Kapustin, L. Zhao, S. Yang, O. M. Yaghi, E. N. Wang, Adsorption-based atmospheric water harvesting device for arid climates. *Nat. Commun.* 9, 1191 (2018).
9. F. Fathich, M. J. Kalmutzki, E. A. Kapustin, P. J. Waller, J. Yang, O. M. Yaghi, Practical water production from desert air. *Sci. Adv.* 4, eaat3198 (2018).
10. N. Hanikel, M. S. Prévot, F. Fathich, E. A. Kapustin, H. Lyu, H. Wang, N. J. Diercks, T. G. Glover, O. M. Yaghi, Rapid Cycling and Exceptional Yield in a Metal-Organic Framework Water Harvester. *ACS Cent. Sci.* 5, 1699-1706 (2019).
11. N. Hanikel, M. S. Prévot, O. M. Yaghi, MOF water harvesters. *Nat. Nanotechnol.* 15, 348-355 (2020).
12. M. M. Mekonnen, A. Y. Hoekstra, Four billion people facing severe water scarcity. *Sci. Adv.* 2, e1500323 (2016).
13. A. I. Kolesnikov, J. M. Zanotti, C. K. Loong, P. Thiyagarajan, A. P. Moravsky, R. O. Loutfy, C. J. Burnham, Anomalously soft dynamics of water in a nanotube: A revelation of nanoscale confinement. *Phys. Rev. Lett.* 93, 1-4 (2004).
14. X. Lin, A. J. Blake, C. Wilson, X. Z. Sun, N. R. Champness, M. W. George, P. Hubberstey, R. Mokaya, M. Schröder, A Porous Framework Polymer Based on a Zinc(II) 4,4'-Bipyridine-2,6,2',6'-tetracarboxylate: Synthesis, Structure, and "Zeolite-Like" Behaviors. *J. Am. Chem. Soc.* 128, 10745-10753 (2006).
15. Y.-K. Seo, J. W. Yoon, J. S. Lee, Y. K. Hwang, C.-H. Jun, J.-S. Chang, S. Wuttke, P. Bazin, A. Vimont, M. Daturi, S. Bourrelly, P. L. Llewellyn, P. Horcajada, C. Serre, G. Férey, Energy-Efficient Dehumidification over Hierachically Porous Metal-Organic Frameworks as Advanced Water Adsorbents. *Adv. Mater.* 24, 806-810 (2012).
16. H. Furukawa, F. Gándara, Y.-B. Zhang, J. Jiang, W. L. Queen, M. R. Hudson, O. M. Yaghi, Water Adsorption in Porous Metal-Organic Frameworks and Related Materials. *J. Am. Chem. Soc.* 136, 4369-4381 (2014).
17. J. Varlec, A. Krajnc, M. Mazaj, A. Ristić, K. Vanatalu, A. Oss, A. Samoson, V. Kaučič, G. Mali, Dehydration of A1PO4-34 studied by variable-temperature NMR, XRD and first-principles calculations. *New J. Chem.* 40, 4178-4186 (2016).
18. S. M. Towsif Abtab, D. Alezi, P. M. Bhatt, A. Shkurenko, Y. Belmabkhout, H. Aggarwal, Ł. J. Weseliński, N. Alsadun, U. Samin, M. N. Hedhili, M. Eddaoudi, Reticular Chemistry in Action: A Hydrolytically Stable MOF Capturing Twice Its Weight in Adsorbed Water. *Chem.* 4, 94-105 (2018).
19. M. Wahiduzzaman, D. Lenzen, G. Maurin, N. Stock, M. T. Wharmby, Rietveld Refinement of MIL-160 and Its Structural Flexibility Upon H 2 O and N 2 Adsorption. *Eur. J. Inorg. Chem.* 2018, 3626-3632 (2018).
20. A. J. Rieth, K. M. Hunter, M. Dincă, F. Paesani, Hydrogen bonding structure of confined water templated by a metal-organic framework with open metal sites. *Nat. Commun.* 10, 1-7 (2019).
21. V. Bon, I. Senkovska, J. D. Evans, M. Wöllner, M. Hölzel, S. Kaskel, Insights into the water adsorption mechanism in the chemically stable zirconium-based MOF DUT-67—a prospective material for adsorption-driven heat transformations. *J. Mater. Chem.* A. 7, 12681-12690 (2019).
22. N. C. Burtch, I. M. Walton, J. T. Hungerford, C. R. Morelock, Y. Jiao, J. Heinen, Y. S. Chen, A. A. Yakovenko, W. Xu, D. Dubbeldam, K. S. Walton, In situ visualization of loading-dependent water effects in a stable metal-organic framework. *Nat. Chem.* 12, 186-192 (2020).
23. H. Deng, C. J. Doonan, H. Furukawa, R. B. Ferreira, J. Towne, C. B. Knobler, B. Wang, O. M. Yaghi, Multiple Functional Groups of Varying Ratios in Metal-Organic Frameworks. *Science.* 327, 846-850 (2010).
24. L. M. Aguirre-Díaz, F. Gándara, M. Iglesias, N. Snejko, E. Gutiérrez-Puebla, M. Á. Monge, Tunable catalytic activity of solid solution metal-organic frameworks in one-pot multicomponent reactions. *J. Am. Chem. Soc.* 137, 6132-6135 (2015).
25. V. A. Blatov, A. P. Shevchenko, D. M. Proserpio, Applied topological analysis of crystal structures with the program package topospro. *Cryst. Growth Des.* 14, 3576-3586 (2014).
26. M. Eddaoudi, J. Kim, N. Rosi, D. Vodak, J. Wachter, M. O'Keeffe, O. M. Yaghi, Systematic design of pore size and functionality in isoreticular MOFs and their application in methane storage. *Science.* 295, 469-472 (2002).
27. V. Colombo, C. Montoro, A. Maspero, G. Palmisano, N. Masciocchi, S. Galli, E. Barca, J. A. R. Navarro, Tuning the adsorption properties of isoreticular pyrazolate-based metal-organic frameworks through ligand modification. *J. Am. Chem. Soc.* 134, 12830-12843 (2012).
28. X. Liu, X. Wang, F. Kapteijn, Water and Metal-Organic Frameworks: From Interaction toward Utilization. *Chem. Rev.* 120, 8303-8377 (2020).
29. H. Reinsch, M. A. van der Veen, B. Gil, B. Marszalek, T. Verbiest, D. de Vos, N. Stock, Structures, Sorption Characteristics, and Nonlinear Optical Properties of a New Series of Highly Stable Aluminum MOFs. *Chem. Mater.* 25, 17-26 (2013).
30. N. Ko, P. G. Choi, J. Hong, M. Yeo, S. Sung, K. E. Cordova, H. J. Park, J. K. Yang, J. Kim, Tailoring the water adsorption properties of MIL-101 metal-organic frameworks by partial functionalization. *J. Mater. Chem.* A. 3, 2057-2064 (2015).
31. J. E. Mondloch, M. J. Katz, N. Planas, D. Semrouni, L. Gagliardi, J. T. Hupp, O. K. Farha, Are Zr6-based MOFs water stable? Linker hydrolysis vs. capillary-force-driven channel collapse. *Chem. Commun.* 50, 8944-8946 (2014).
32. Bruker AXS Inc., APEX3 (2018).
33. Bruker AXS Inc., SAINT (2018).
34. Bruker AXS Inc., SADABS (2016).

35. G. M. Sheldrick, SHELXT—Integrated space-group and crystal-structure determination. *Acta Crystallogr. Sect. A Found. Crystallogr.* 71, 3-8 (2015).
36. G. M. Sheldrick, Crystal structure refinement with SHELXL. *Acta Crystallogr. Sect. C Struct. Chem.* 71, 3-8 (2015).
37. O. V. Dolomanov, L. J. Bourhis, R. J. Gildea, J. A. K. Howard, H. Puschmann, OLEX2: A complete structure solution, refinement and analysis program. *J. Appl. Crystallogr.* 42, 339-341 (2009).
38. G. Kresse, J. Hafner, Ab initio molecular dynamics for liquid metals. *Phys. Rev. B.* 47, 558-561 (1993).
39. G. Kresse, J. Furthmüller, Efficiency of ab-initio total energy calculations for metals and semiconductors using a plane-wave basis set. *Comput. Mater. Sci.* 6, 15-50 (1996).
40. G. Kresse, J. Furthmüller, Efficient iterative schemes for ab initio total-energy calculations using a plane-wave basis set. *Phys. Rev. B.* 54, 11169-11186 (1996).
41. J. P. Perdew, K. Burke, M. Ernzerhof, Generalized gradient approximation made simple. *Phys. Rev. Lett.* 77, 3865-3868 (1996).
42. S. Grimme, J. Antony, S. Ehrlich, H. Krieg, A consistent and accurate ab initio parametrization of density functional dispersion correction (DFT-D) for the 94 elements H—Pu. *J. Chem. Phys.* 132 (2010), doi: 10.1063/1.3382344.
43. Micromeritics Instruments Corporation, Microactive (2018).
44. F. Brucoli, A. Natoli, P. Marimuthu, M. T. Borrello, P. Stapleton, S. Gibbons, A. Schätzlein, Efficient synthesis and biological evaluation of proximicins A, B and C. Bioorganic *Med. Chem.* 20, 2019-2024 (2012).
45. G. A. Jeffrey, W. Saenger, Hydrogen Bonding in Biological Structures (Springer-Verlag, Berlin, 1994).
46. G. H. Stout, L. H. Jensen, *X-Ray Structure Determination: A Practical Guide* (Wiley, Hoboken, 1989).
47. A. L. Spek, Single-crystal structure validation with the program PLATON. *J. Appl. Crystallogr.* 36, 7-13 (2003).
48. G. M. Sheldrick, Cell_Now (2008).
49. G. M. Sheldrick, TWINABS (2012).
50. C. R. Groom, I. J. Bruno, M. P. Lightfoot, S. C. Ward, The Cambridge structural database. *Acta Crystallogr. Sect. B Struct. Sci. Cryst. Eng. Mater.* 72, 171-179 (2016).
51. J. Sauer, Ab Initio Calculations for Molecule-Surface Interactions with Chemical Accuracy. *Acc. Chem. Res.* 52, 3502-3510 (2019).
52. C. T. Campbell, J. R. V. Sellers, Enthalpies and entropies of adsorption on well-defined oxide surfaces: Experimental measurements. *Chem. Rev.* 113, 4106-4135 (2013).
53. H. Kim, H. J. Cho, S. Narayanan, S. Yang, H. Furukawa, S. Schiffres, X. Li, Y.-B. Zhang, J. Jiang, O. M. Yaghi, E. N. Wang, Characterization of Adsorption Enthalpy of Novel Water-Stable Zeolites and Metal-Organic Frameworks. *Sci. Rep.* 6, 19097 (2016).

The invention claimed is:

1. A porous multivariate metal-organic framework (MOF) comprising a mixture of $PZDC^{2-}$ and $FDC^{2-}$ within one MOF crystal, wherein $PZDC^{2-}$=1-H-pyrazole-3,5-dicarboxylate, $FDC^{2-}$=2,4-furandicarboxylate.

2. A porous multivariate metal-organic framework (MOF) of claim 1, wherein the mixture is in a ratio n/m=7/1, 6/3, 5/3, 4/4, 3/5, 2/6 or 1/7, wherein n is the $PZDC^{2-}$ and m is the $FDC^{2-}$.

3. A porous multivariate metal-organic framework (MOF) of claim 1, comprising $Al(OH)PZDC^{2-}/FDC^{2-}$; wherein the mixture is in a ratio n/m=7/1, 6/3, 5/3, 4/4, 3/5, 2/6 or 1/7, wherein n is the $PZDC^{2-}$ and m is the $FDC^{2-}$.

4. A porous metal-organic framework (MOF) comprising MOF-333: $Al(OH)FDC^{2-}$, wherein $FDC^{2-}$=2,4-furandicarboxylate.

5. A method comprising water harvesting with a porous multivariate metal-organic framework (MOF) of claim 1.

6. A method comprising water harvesting with a porous multivariate metal-organic framework (MOF) of claim 4.

* * * * *